J. J. JOHNSTON.
Soldering Apparatus.
No. 226,404.                    Patented April 13, 1880.
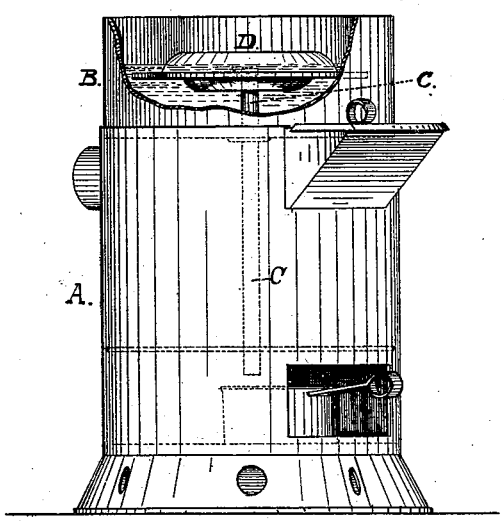
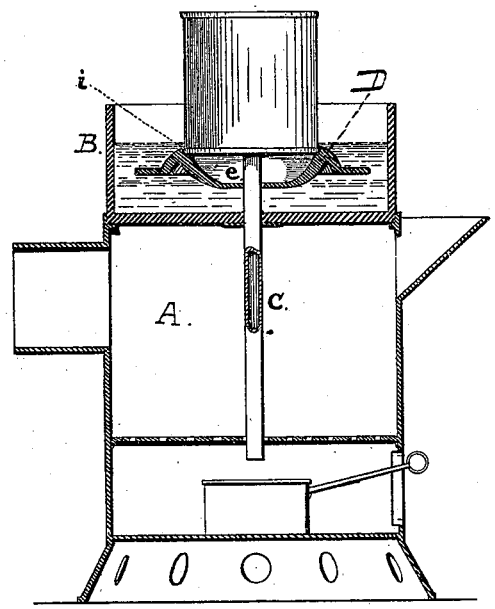
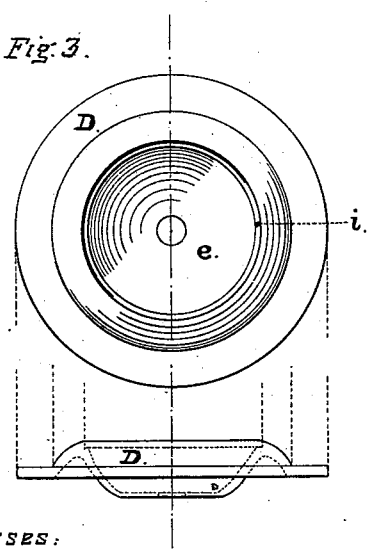

UNITED STATES PATENT OFFICE.

JOHN J. JOHNSTON, OF SAN FRANCISCO, CALIFORNIA.

SOLDERING APPARATUS.

SPECIFICATION forming part of Letters Patent No. 226,404, dated April 13, 1880.

Application filed February 7, 1880.

*To all whom it may concern:*

Be it known that I, JOHN J. JOHNSTON, of the city and county of San Francisco, in the State of California, have invented an Improved Soldering Apparatus; and I do hereby declare that the following is a full, clear, and exact description thereof, reference being had to the accompanying drawings.

My invention consists of a soldering apparatus having a solder-pot superposed upon a furnace, and with a spindle passing up through its bottom, and a float adapted to be guided as it rises and falls in the molten solder in the solder-pot upon said spindle; and in the combination, with the tubular or hollow spindle, of the float with an apertured chamber, up through whose aperture the hollow tube or spindle passes, substantially as hereinafter more fully set forth.

Referring to the accompanying drawings, Figure 1 is an elevation of my apparatus with the side of the solder holder or chamber broken away to expose the invention. Fig. 2 is a sectional elevation through the furnace, the solder-holder, and the float, illustrating the action of the float and the position of the can upon it in the soldering operation; and Fig. 3 shows an enlarged detail plan and side views of the float.

A refers to an ordinary solder-furnace with its top removed. On the top of this furnace I place a solder pot or vessel, B, so that the heat of the fire in the furnace will melt the solder in the pot and keep it fluid. In the center of the pot I place a vertical post or spindle, C, which serves a guide for the float D. This float is made of cast-iron or other metal that will float on the top of molten solder. This float is provided with an annular downwardly-curved flange, thence preferably extended into a horizontal rim, while it is provided upon its inside near the top with an annular depression or groove, *i*, for the vessel to be soldered to set in, and below this with a concavity, *e*, for lightness.

In the center of the bottom of the float is an orifice just large enough for the spindle C to pass up through it without permitting the admission of the molten metal or solder around the spindle.

In preparing the pot for operation, I first fill it with molten metal or solder until the latter is about level with the top of the spindle C. I then place the float D upon the top of the metal, so that the end of the spindle will pass through the hole in its center. The float will, of course, cause the displacement of a certain amount of the molten solder, when the latter will rise around the rim of the float. The head having been fitted on the can or vessel to be soldered and the necessary acid or flux applied, I place this head so that its edge will rest in the depression or groove *i* on the float. I then depress the float with the superposed vessel until the molten metal or solder rises around the float and covers the seam or lap of the cover or end piece, thus applying the solder, which will adhere and solder the joint, when the can is removed.

The concavity *e* provides for holding in an isolated position with relation to the bottom of the can or vessel any solder that may possibly get into the float.

In practice I make the spindle tubular and extend it down through the fire-pot or furnace, so that its lower end will terminate below the grate above the ash pit or pan, as represented in the drawings, or it could pass down through the bench or table on which the furnace rests. I then place a cup below the lower end, so as to catch any solder that may flow through the tube. The heat will prevent the adherence of the solder to the tube.

The purpose of making the spindle tubular is to pass off any solder in the concavity of the float, as when the float rises upon the removal of the soldered can or vessel therefrom it will flow into the tube of the spindle, whose upper end will now stand about on a level with the bottom of the concavity, and from the tube it passes into the cup below. This avoids any appreciable amount of solder remaining in the float, a discharge taking place each time a vessel or can, after soldering, is removed.

A sufficient quantity of solder is kept in the pot or vessel B to keep the bottom of the concavity *e* of the float D about on a level with the upper end of the tubular spindle C.

It will be impossible to depress the float too much, as pressure is applied to the can or vessel to be soldered as the bottom of the can will strike the upper end of the spindle when the float has been sufficiently immersed.

For large cans or vessels, where a large float is required, I can apply a foot-treadle for depressing the float, and, if desired, springs could be applied to raise it again; but generally its flotation will be sufficient.

By the foregoing arrangement I can solder tin cans or vessels with great speed and facility.

Having thus fully described my invention, I claim and desire to secure by Letters Patent—

1. In a soldering apparatus, the combination, with the furnace A, the solder-pot B, and spindle C, of the float D, sliding on the spindle C, substantially as and for the purpose specified.

2. In a soldering apparatus, the combination of the furnace A, the solder-pot B, hollow or tubular spindle C, and float D, having a centrally-apertured chamber, and sliding on the hollow spindle C, substantially as and for the purpose specified.

In witness whereof I have hereunto set my hand and seal.

JOHN J. JOHNSTON. [L. S.]

Witnesses:
GEO. T. KNOX,
WM. F. CLARK.